Aug. 19, 1952 J. A. PIANFETTI ET AL 2,607,723
PRODUCTION OF HEXACHLOROCYCLOHEXANE
Filed Jan. 6, 1948
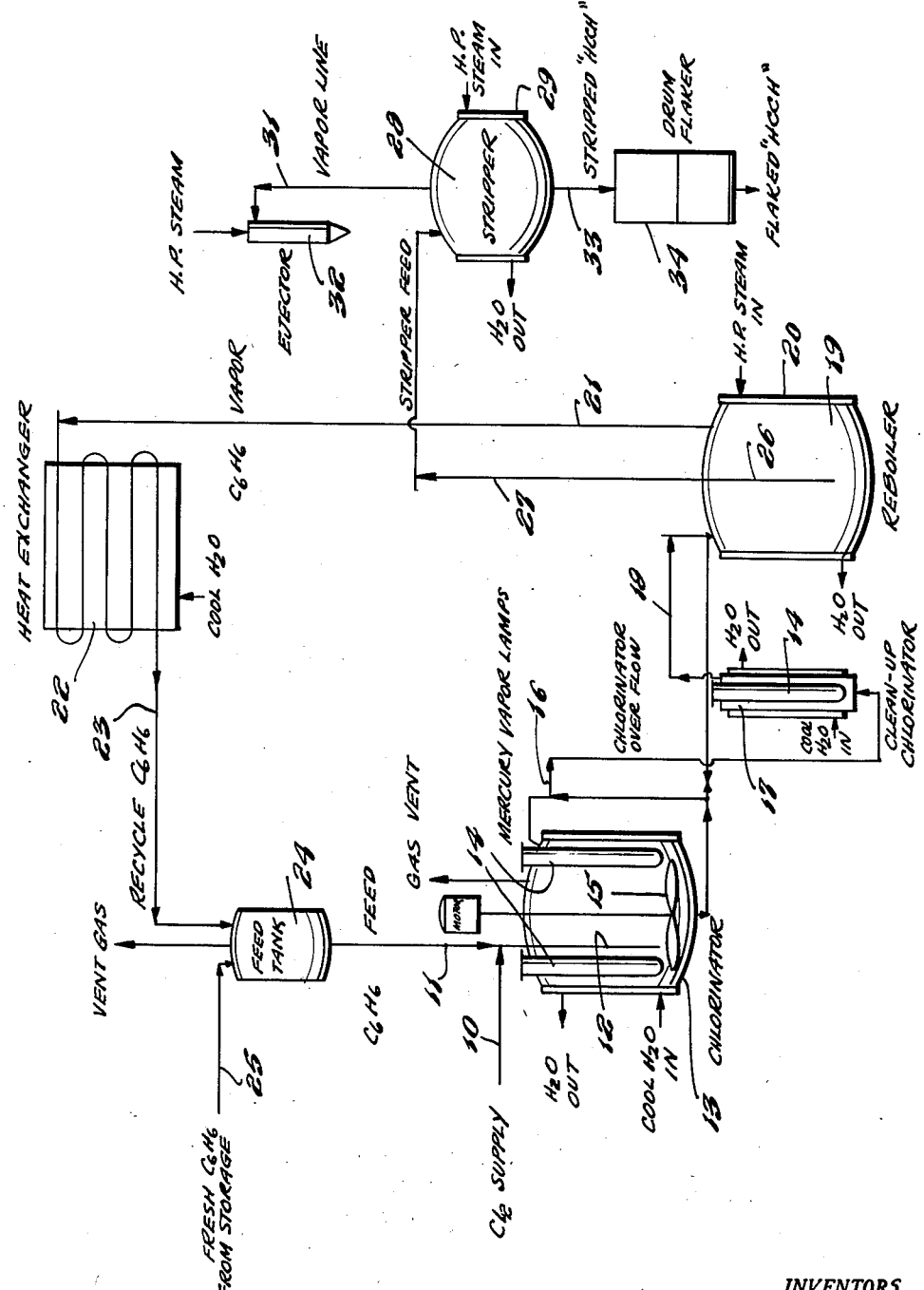
INVENTORS
JOHN A. PIANFETTI,
MAX Y. SEATON,
BY DWIGHT WILLIAMS
Hammond & Littell
ATTORNEYS Patented Aug. 19, 1952

2,607,723

UNITED STATES PATENT OFFICE 2,607,723

PRODUCTION OF HEXACHLOROCYCLO-HEXANE

John A. Pianfetti, South Charleston, W. Va., Max Y. Seaton, Greenwich, Conn., and Dwight Williams, Charleston, W. Va., assignors to Food Machinery and Chemical Corporation, Wilmington, Del., a corporation of Delaware Application January 6, 1948, Serial No. 710

8 Claims. (Cl. 204—163)

This invention relates to an improved process for the production of benzene hexachloride or hexachlorocyclohexane by the action of chlorine on benzene in the presence of actinic light.

This general process has been known for many years, but substantial experimentation evaluating the prior modes of operation described in the patent and other literature has revealed that there are a number of unsolved problems preventing continuous and most efficient operation at uniformly high yields. Prior experimentors have suggested undesirably complicated and expensive reaction vessels and internal constructions requiring special procedures for accomplishing efficient contact between the benzene and the chlorine for controlling the temperature and reducing the proportion of by-products formed. Now it has been discovered that the reaction of chlorine with benzene in the presence of actinic light can be expeditiously carried out in very simple apparatus with as great or even greater efficiency than prior processes for the production of hexachlorocyclohexane of high uniform quality.

In one process heretofore suggested, an excess of benzene cooled to a low temperature has been sprayed or flowed in film form countercurrent to a stream of chlorine gas in a reactor illuminated with actinic light whereby hexachlorocyclohexane has been formed in solution in the benzene, after which part of the benzene has been recovered from the process by distillation leaving a residue composed of a concentrated solution of the hexachlorocyclohexane in benzene with various impurities from which the hexachlorocyclohexane is separated by crystallization and settling.

It has now been found that this process has a number of disadvantages in requiring cooling of the benzene, in reacting at unnecessarily low temperatures, in not completely avoiding deposition of hexachlorocyclohexane particularly in the chlorine inlet into the reactor, in using specially constructed means for contacting the chlorine and benzene for obtaining adequate reaction, and especially in employing a crystallizing, settling operation not only leading to segregation of the isomers and as a consequence to a lack of uniformity in quality in the final products obtained, but also requiring additional equipment and operations for removing benzene from the crystals, involving both fire and health risks.

Objects of the present invention include the desire to provide a process of mixing and reacting chlorine with benzene capable of being carried out in simple apparatus and capable of operation at higher and more efficient temperatures maintainable by uniform withdrawal of exothermic heat from the reaction mass. Other objects are to produce hexachlorocyclohexane products of uniform isomer and impurity content whereby products of uniform insecticidal properties are produced or can be produced with the minimum of testing.

In accordance with one embodiment of the invention, chlorine and benzene in a sufficient excess to maintain the hexachlorocyclohexane formed in solution are mixed together and thereafter introduced and passed through a reaction zone illuminated with actinic light and in contact with cooling surfaces surrounding the zone. While passing through the zone, the benzene-chlorine mixture is thoroughly agitated in such manner as to cause all of the mass to be adequately exposed to the actinic light and to cause all parts of the mass to contact frequently and thoroughly with the cooled surfaces thereby to maintain the temperature uniformly at from about 40° to 60° C. After the reaction of the benzene with the chlorine has proceeded to a point where no free chlorine remains in the benzene, the reaction mass is flowed to a boiler wherein the benzene is substantially completely volatilized at a temperature sufficient to provide the hexachlorocyclohexane in molten condition. The volatilized benzene is condensed and reintroduced into the reaction zone. The molten hexachlorocyclohexane residue from the distillation is then cooled and solidified most suitably by spreading the same on a cooled surface, from which it is scraped in the form of flakes.

Although it is preferred to carry out the reaction between the chlorine and benzene at a temperature of about 50° C., the present invention in its broadest scope contemplates the less satisfactory temperatures of from 10° up to as high as 80° C. Reaction at the preferred temperature has the advantages, (1) that objectionable amounts of substitution products obtained at higher temperatures are not produced, (2) that the solubility of the hexachlorocyclohexane product in the benzene is higher than it is at low temperatures, thus permitting the use of less excess of benzene to be distilled, and (3) that the uniform removal of the heat of reaction is more effectively accomplished than at low temperatures.

The amount of excess of benzene is preferably the minimum quantity required to maintain the hexachlorocyclohexane product in solution until it reaches the distillation apparatus. When the reaction is carried out at approximately 50° C., the molar ratio of chlorine to benzene employed is approximately 0.25 to 1, the actual combined ratio in hexachlorocyclohexane being 3 to 1. At 80° C. a sufficient excess is provided if the ratio is as high as 2 to 1, whereas at 10° C. the ratio cannot be much higher than 0.1 to 1.

It is known that hexachlorocyclohexane exists in the form of at least 5 stereo isomers. Although one of these isomers, namely the gamma, is more effective than the others as an insecticide, the presence of other isomers in hexachlorocyclohexane products apparently does no harm. Dilution with inert or less potent powders is conventional. The product of the present invention, containing a substantial proportion of the gamma isomer can therefore be used for insecticidal purposes without resorting to isolation of the gamma isomer. Since this hexachlorocyclohexane product is produced without crystallization and separation of mother liquor containing dissolved isomers, it is uniform from batch to batch and therefore does not require extensive potency tests for assuring constant quality.

A preferred procedure will be described with reference to the accompanying drawing wherein the apparatus and connections are diagrammatically illustrated.

Chlorine gas is introduced through a line 10 into a stream of benzene in the feed line 11 leading to a nickel standleg 12 terminating near the bottom of a reaction vessel or chlorinator 13 jacketed for the introduction of cool water. The interior surface coating of the vessel 13 or the vessel itself must be composed of material which does not catalyze the substitution reaction, as glass or nickel, for otherwise undesired substitution products would be produced. For the same reason the reactants should be relatively pure or free from catalyzing impurities. Two mercury vapor lamps 14 (any number can be used) are mounted in the top of the reaction vessel 13 and extend substantially to the bottom thereof. The said reactor is provided with a motor operated stirring device or paddles 15. It will be observed that the chlorine and benzene are premixed in the dark or before they are exposed to the actinic light in the vessel. Through this procedure and the agitation of the reaction mass in the reaction vessel, no separation or deposition of hexachlorocyclohexane occurs in the vessel or lines to prevent continuous operation.

The concurrent flow of the reaction mass through the reaction vessel is maintained at a rate which brings about substantially complete reaction of all of the chlorine introduced into the vessel. The reaction mass in the vessel 13 flows from the bottom thereof up and through a conduit 16 to a smaller jacketed reaction vessel 17 of construction material similar to the reaction vessel 13 wherein any residual chlorine dissolved in the benzene is completely taken up by reaction in the mass. This supplemental reactor insures that no chlorine reaches the boiler wherein chlorine substitution products would be produced if the chlorine were present.

After exposure to the mercury vapor lamp 14 in the vessel 17, the reaction mass flows from the top thereof through a line 18 to a distillation vessel or reboiler 19 provided with a jacket 20 for high pressure steam.

In this vessel 19 benzene is distilled from the reaction mass at a temperature of about 130° C. The vapor from the vessel 19 passes through the line 21 to a heat exchanger 22 composed suitably of Pyrex glass. The condensed benzene obtained therein flows through the conduit 23 into a benzene feed tank 24. Fresh benzene from storage is also fed into the tank 24 through the conduit 25.

When distillation of the benzene in the reboiler 19 has proceeded to a point where a hexachlorocyclohexane product containing about 10% benzene is obtained, such product is flowed therefrom through the nickel standleg 26 and line 27 to a stripper or supplemental boiler 28 also having a jacket 29 for high pressure steam.

In the stripper the mass is heated to a temperature of about 140° C. under a vacuum suitably of 100 mm. of mercury. The vacuum is applied through a line 31 and a high pressure steam-actuated ejector 32. Instead of using a vacuum to provide a reduced total pressure, steam or other fluid may be directly introduced into the stripper to create a reduced partial pressure.

The evaporation under reduced pressure, either total or partial, is continued until a hexachlorocyclohexane product is obtained containing substantially no benzene or only up to about 0.5%. Thereupon the product, designated "stripped HCCH," which is in molten form is flowed from the boiler or stripper through the conduit 33 on to a drum flaker 34 from which the cooled and solidified product, designated "flaked HCCH," is removed in the form of fine flakes by the usual scraping operation.

Although the benzene distillation temperature is preferably at about 130° C., the present invention in its broader scope contemplates all temperatures capable of accomplishing removal of the benzene while leaving the hexachlorocyclohexane undisturbed. In any event, at the conclusion of the distillation the hexachlorocyclohexane product should be at, or brought to a temperature of about 140° C., providing a substantially benzene-free molten mass capable of being flowed and solidified upon a cooled surface.

Some of the advantages hereinbefore described for the continuous process may also be obtained when the process is operated in batch-wise fashion. The present invention in its broadest aspects therefore includes processes in which a single vessel may be made to serve in succession as the chlorinator, the boiler and the stripper.

In a typical batch process, a jacketed vessel provided with a stirrer and actinic light source is first charged with benzene, then chlorine is introduced during stirring and the temperature is maintained at 50° C. or within the range hereinbefore disclosed. After a time, the saturation point of the solution is reached, with crystals of hexachlorocyclohexane beginning to form. Thereupon the temperature is raised gradually to some higher temperature of, or approaching, 80° C. and the introduction of chlorine is continued until the chlorine-benzene ratio reaches about 2 to 1. If the temperature were raised higher than about 80° C. additional chlorine could react in the mass, but ordinarily such procedure leads to the formation of objectionable quantities of substitution products. The present invention broadly contemplates this high temperature procedure, but the substitution products, if not utilized, make this variation uneconomical.

After the chlorination step is complete, the temperature is raised in order to vaporize off the benzene, this result being again most satisfactorily accomplished at 130° C. Near the end of this benzene removal step, the pressure is reduced in order to facilitate the volatilization of substantially all of the remaining benzene. Before its solidification, the molten hexachlorocyclohexane residue is flowed from the boiler and solidified by spreading the same on a cool surface in the manner hereinbefore described. Analysis of the product will show that the chlorine has entered the benzene molecules uniformly at the six carbon atoms, and that its formula is 1, 2, 3, 4, 5, 6-hexachlorocyclohexane.

In the process hereinbefore described the excess of benzene called for therein may be replaced in part or wholly by some inert solvent such as carbon tetrachloride which will maintain in solution the reaction product formed. The use of the inert solvent, however, is not preferred, for it would appreciably complicate the operation of the process.

It should be understood that the present invention is not limited to the specific details herein disclosed but that it extends to all equivalent procedures which will occur to those skilled in the art upon consideration of the scope of the claims appended hereto.

We claim:

1. The process of producing hexachlorocyclohexane from chlorine and benzene in a liquid phase reaction which comprises mixing chlorine with benzene in an excess adequate to maintain the hexachlorocyclohexane formed in solution, agitating the resulting mixture in a reaction zone irradiated by actinic light at an intensity which causes all parts of the reaction mixture to be thoroughly exposed to the actinic light and repeatedly contacted with the walls of the reaction zone, maintaining the temperature of the reaction solution substantially uniform by withdrawing excess exothermic heat from the walls of the zone and after the reaction is substantially complete distilling off the excess benzene at a final temperature which provides the hexachlorocyclohexane in molten form and removing the molten product from the distillation zone and cooling and solidifying the same.

2. The process of producing hexachlorocyclohexane from chlorine and benzene in a liquid phase reaction which comprises mixing chlorine with benzene in the presence of an inert solvent adequate to maintain the hexachlorocyclohexane formed in solution, agitating the resulting mixture in a reaction zone irradiated by actinic light at an intensity which causes all parts of the reaction mixture to be thoroughly exposed to the actinic light and repeatedly contacted with the walls of the reaction zone, maintaining the temperature of the reaction solution substantially uniform by withdrawing excess exothermic heat from the walls of the zone and after the reaction is substantially complete distilling off the solvent with the aid of reduced pressure at a temperature which provides the hexachlorocyclohexane in molten form and after the molten material has been removed from the distillation zone, cooling and solidifying the same.

3. The process of producing hexachlorocyclohexane from chlorine and benzene in a liquid phase reaction which comprises mixing chlorine with benzene in an excess adequate to maintain the hexachlorocyclohexane formed in solution, agitating the resulting mixture in a reaction zone irradiated by actinic light at an intensity which causes all parts of the reaction mixture to be thoroughly exposed to the actinic light and repeatedly contacted with the walls of the reaction zone, maintaining the temperature of the reaction solution substantially uniform by withdrawing excess exothermic heat from the walls of the zone and after the reaction is substantially complete distilling off most of the benzene, condensing the benzene vapors for reuse in the process, vaporizing off substantially all of the remaining benzene from the hexachlorocyclohexane under partial vacuum at a temperature around 140° C. thereby producing the hexachlorocyclohexane in molten condition, thereafter cooling and solidifying the hexachlorocyclohexane.

4. The process of producing hexachlorocyclohexane from chlorine and benzene in a liquid phase reaction which comprises introducing chlorine, benzene and a solvent adequate to maintain the hexachlorocyclohexane formed in solution into a reacting body of the same materials, reacting the added materials under irradiation by actinic light whereby a solution of hexachlorocyclohexane in the solvent is obtained, recovering the hexachlorocyclohexane from the solution by distilling off substantially all of the solvent at a temperature providing the hexachlorocyclohexane in molten form, thereafter flowing the molten mass upon a cooled surface thereby solidifying the same and scraping the solidified mass from the surface thereby providing hexachlorocyclohexane in flaked form.

5. The process of producing hexachlorocyclohexane from chlorine and benzene in a liquid phase reaction which comprises mixing chlorine with a body of benzene in an excess adequate to maintain the hexachlorocyclohexane formed in solution, reacting the resulting bodies of reactants under irradiation by actinic light whereby a solution of hexachlorocyclohexane in benzene is obtained, recovering the hexachlorocyclohexane from the benzene solution by distilling off most of the benzene at atmospheric pressure and vaporizing off substantially all of the remaining benzene at a reduced pressure and at a raised temperature which produces the hexachlorocyclohexane in molten condition and thereafter cooling and solidifying the hexachlorocyclohexane.

6. The process of producing hexachlorocyclohexane from chlorine and benzene in a liquid phase reaction which comprises continuously passing a mixture of chlorine and benzene in an excess adequate to maintain the hexachlorocyclohexane formed in solution, into a reaction zone under irradiation by actinic light, continuously reacting the chlorine with the benzene in the reaction zone thereby forming hexachlorocyclohexane in benzene solution, continuously passing the reaction mass into a distillation zone, continuously distilling off most of the benzene, and when only a minor amount of benzene remains in the hexachlorocyclohexane passing the same to a heating zone and vaporizing off in said heating zone substantially all of the remaining benzene at a temperature providing the hexachlorocyclohexane in molten form and finally flowing the molten mass from the said heating zone upon a cool surface and solidifying the same, from which surface the solidified mass can be scraped to provide the hexachlorocyclohexane in flaked form.

7. The process of producing hexachlorocyclohexane from chlorine and benzene in a liquid phase reaction which comprises, mixing chlorine with a body of benzene and a solvent adequate to maintain the hexachlorocyclohexane formed in solution, reacting the same under irradiation by actinic light at a temperature above 10° C. continuing the reaction by flowing benzene, solvent and chlorine into said body and continuing the reaction until hexachlorocyclohexane is formed in solution in the solvent, recovering the hexachlorocyclohexane from the solution by distilling off substantially all of the solvent present at a temperature providing the hexachlorocyclohexane in molten form, removing the molten material from the distillation zone, cooling and solidifying the same.

8. The process of producing hexachlorocyclohexane which comprises, mixing chlorine with benzene in an excess adequate to maintain the hexachlorocyclohexane formed in solution, agitating the resulting mixture in a reaction zone irradiated by actinic light at an intensity which causes all parts of the reaction mixture to be thoroughly exposed to the actinic light and repeatedly contacted with the walls of the reaction zone, maintaining the reaction solution at an elevated temperature not substantially in excess of 60° C. by withdrawing excess exothermic heat from the walls of the zone and after the reaction is substantially complete distilling off the excess benzene at a final temperature which provides the hexachlorocyclohexane in molten form, removing the molten product from the distillation zone, cooling and solidifying the same by flowing the molten mass upon a cool surface and scraping the solidified mass from the surface, thereby providing the hexachlorocyclohexane in flaked form.

JOHN A. PIANFETTI.
MAX Y. SEATON.
DWIGHT WILLIAMS.

REFERENCES CITED

The following references are of record in the file of this patent:

UNITED STATES PATENTS

| Number | Name | Date |
| --- | --- | --- |
| 1,523,563 | Snelling | Jan. 20, 1925 |
| 1,954,438 | Britton et al. | Apr. 10, 1934 |
| 2,010,841 | Bender | Aug. 13, 1935 |
| 2,218,148 | Hardie | Oct. 15, 1940 |
| 2,499,120 | Stormon | Feb. 28, 1950 |

FOREIGN PATENTS

| Number | Country | Date |
| --- | --- | --- |
| 504,569 | Great Britain | Apr. 26, 1939 |

OTHER REFERENCES

Bezobrazov et al., Chemical Abstracts, vol. 41 (1947), page 4111.